(12) United States Patent
Riedel et al.

(10) Patent No.: US 10,165,316 B2
(45) Date of Patent: Dec. 25, 2018

(54) DEVICE, SYSTEM, AND METHOD FOR HYBRID MEDIA CONTENT DISTRIBUTION

(71) Applicant: Viacom International Inc., New York, NY (US)

(72) Inventors: Gregg William Riedel, New York, NY (US); Glenn Goldstein, New York, MA (US)

(73) Assignee: VIACOM INTERNATIONAL INC., New York, NY (US)

(*) Notice: Subject to any disclaimer, the term of this patent is extended or adjusted under 35 U.S.C. 154(b) by 0 days.

(21) Appl. No.: 15/087,626

(22) Filed: Mar. 31, 2016

(65) Prior Publication Data

US 2017/0289597 A1 Oct. 5, 2017

(51) Int. Cl.
*H04N 21/2183* (2011.01)
*H04N 21/258* (2011.01)
*H04N 21/45* (2011.01)
*H04N 21/81* (2011.01)
*H04N 21/262* (2011.01)
(Continued)

(52) U.S. Cl.
CPC ... *H04N 21/25891* (2013.01); *H04N 21/2183* (2013.01); *H04N 21/262* (2013.01); *H04N 21/4345* (2013.01); *H04N 21/4383* (2013.01); *H04N 21/4532* (2013.01); *H04N 21/812* (2013.01)

(58) Field of Classification Search
CPC ............. H04N 21/251; H04N 21/2581; H04N 21/25891; H04N 21/4661; H04N 21/4668; H04N 21/25808; H04N 21/15841; H04N 21/2183; H04N 21/262; H04N 21/4345; H04N 21/4383; H04N 21/4532; H04N 21/812; H04N 21/25841
See application file for complete search history.

(56) References Cited

U.S. PATENT DOCUMENTS 6,148,330 A * 11/2000 Puri ................. G06F 17/30867
707/E17.109
2008/0127246 A1* 5/2008 Sylvain ............ H04N 21/25435
725/32
(Continued)

*Primary Examiner* — Hunter B Lonsberry
(74) *Attorney, Agent, or Firm* — Fay Kaplun & Marcin, LLP

(57) ABSTRACT

A device, system, and method synthesizes personalized linear television experiences from on-demand assets, live event video, streaming graphics, and dynamic ad insertion, where portions of the broadcast day are scheduled for globally shared viewing events, where other portions are scheduled for distinct programming for various audience segments. Vector graphics are streamed independently of the video and rasterized locally to improve quality and contextualization of the graphics layer while gaining the efficiency of leveraging the same cached video assets for linear and on-demand applications. The system includes origination services transforming and publishing linear television schedules, video, and graphics to a distribution cache, a live event server streaming live performances, an advertising server providing targeted advertising, a personalization server, and assembly services stitching the elements to create a continuous experience of video and graphics for a media player to receive and render for each channel selected by the viewer.

18 Claims, 7 Drawing Sheets

(51) Int. Cl.
*H04N 21/434* (2011.01)
*H04N 21/438* (2011.01)

(56) References Cited

U.S. PATENT DOCUMENTS

| | | | | |
|---|---|---|---|---|
| 2008/0244658 | A1* | 10/2008 | Chen | H04N 7/17318 |
| | | | | 725/50 |
| 2013/0205332 | A1* | 8/2013 | Martin | H04N 21/00 |
| | | | | 725/32 |
| 2014/0237520 | A1* | 8/2014 | Rothschild | H04N 21/236 |
| | | | | 725/88 |
| 2015/0134782 | A1* | 5/2015 | Arana | H04L 65/4084 |
| | | | | 709/219 |
| 2015/0296274 | A1* | 10/2015 | Good | H04N 21/84 |
| | | | | 725/93 |
| 2016/0127440 | A1* | 5/2016 | Gordon | H04N 21/23439 |
| | | | | 709/219 |
| 2016/0173961 | A1* | 6/2016 | Coan | H04N 21/812 |
| | | | | 725/32 |
| 2016/0248835 | A1* | 8/2016 | Petrangeli | H04L 65/608 |
| 2016/0248884 | A1* | 8/2016 | Larabi | H04L 67/2814 |
| 2017/0208372 | A1* | 7/2017 | Thorwirth | H04N 21/8358 |

* cited by examiner

DEVICE, SYSTEM, AND METHOD FOR HYBRID MEDIA CONTENT DISTRIBUTION

BACKGROUND INFORMATION

A user may receive media content in a variety of ways. A conventional way of receiving media content is through a television. The television may utilize a broadcast signal received from a distributor such as a programming provider or multichannel video-programming distributor (MVPD). The distributor may receive media content from one or more producers. The distributor may receive the media content and store it for use in subsequent playback for the user.

Each of the ways of receiving media content may also include different manners of providing the media content. A conventional manner of providing the media content in a television broadcast is through a linear distribution model. The linear distribution model utilizes a predetermined ordering of playback. Thus, a programming schedule may be fixed and the user tunes in to watch desired media content at the predetermined slotted time. Accordingly, the linear distribution model utilizes a "push" model to provide the programming. However, the user is provided no flexibility in viewing media content on a given channel. Further manners of providing the media content have been used including a non-linear distribution model such as video-on-demand. The non-linear distribution model may utilize a request feature in which the user transmits a request for desired media content and the distributor provides the desired media content (e.g., streaming) in response to the user's request. Accordingly, the non-linear distribution model utilizes a "pull" model to provide the programming. Therefore, the user is provided with a great deal of flexibility in viewing media content.

The linear distribution model typically utilizes baseband video technologies and full assembly of the media content (video and graphics) at origination facilities, resulting in a high cost system that pushes a continuous video stream. In contrast, the non-linear distribution model may utilize a remote storage database that caches the available media content, enabling clients to pull media as needed, resulting in a lower cost system where linear and on-demand media assets may be shared.

SUMMARY

The exemplary embodiments are directed to a method, comprising: in a media content distribution system: receiving a programming request from a media player, the programming request identifying a channel to be tuned on the media player; generating a programming schedule for the media player, the programming schedule defining an ordering for playout of audio/visual (A/V) assets and graphics assets associated with the channel; generating an A/V manifest for the media player, the A/V manifest identifying the A/V assets for the media player to request the A/V assets from a content delivery network (CDN); generating a graphics manifest for the media player, the graphics manifest identifying the graphics assets for the media player to request the graphics assets from the CDN; and transmitting the programming schedule, the A/V manifest, and the graphics manifest to the media player.

The exemplary embodiments are directed to a media content distribution system, comprising: an assembly service component receiving a programming request from a media player, the programming request identifying a channel to be tuned on the media player; and an origination service component including a scheduling module and an assembly services module, the scheduling module generating a programming schedule for the media player, the programming schedule defining an ordering for playout of audio/visual (A/V) assets and graphics assets associated with the channel, the assembly services module generating an A/V manifest for the media player, the A/V manifest identifying the A/V assets for the media player to request the A/V assets from a content delivery network (CDN), and the assembly services module generating a graphics manifest for the media player, the graphics manifest identifying the graphics assets for the media player to request the graphics assets from the CDN, wherein the programming schedule, the A/V manifest, and the graphics manifest are transmitted to the media player.

The exemplary embodiments are directed to a method, comprising: in a media player: transmitting a programming request identifying a channel to be tuned on the media player; receiving a programming schedule for the media player, the programming schedule defining an ordering for playout of audio/visual (A/V) assets and graphics assets associated with the channel; receiving an A/V manifest for the media player, the A/V manifest identifying the A/V assets for the media player to request the A/V assets from a content delivery network (CDN); receiving a graphics manifest for the media player, the graphics manifest identifying the graphics assets for the media player to request the graphics assets from the CDN; transmitting a request for the A/V assets and the graphics assets from the CDN as identified in the A/V manifest and the graphics manifest, respectively; receiving the A/V assets and the graphics assets; and rendering the A/V assets and the graphics assets for playout on a display device based upon the programming schedule.

DETAILED DESCRIPTION

Figure 1:
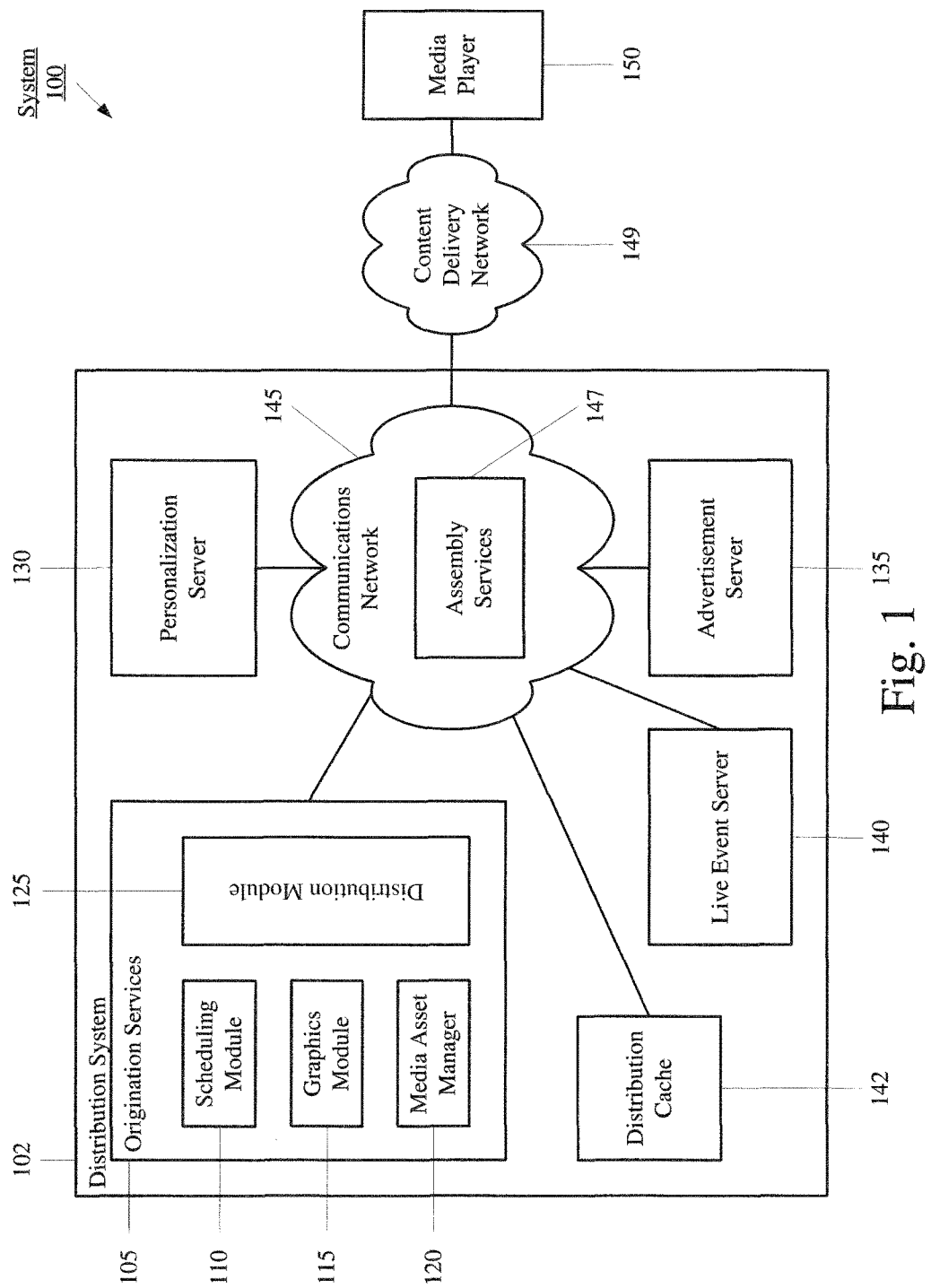
FIG. 1 shows a system according to the exemplary embodiments.

The exemplary embodiments may be further understood with reference to the following description and the related appended drawings, wherein like elements are provided with the same reference numerals. The exemplary embodiments are related to a device, system, and method for media content distribution. Specifically, the exemplary embodiments provide a hybrid mechanism in which media content is distributed using features of a linear distribution model and features of a non-linear distribution model. Accordingly, the hybrid mechanism of the exemplary embodiments utilizes a pull model but appears as if a push model. The exemplary embodiments also provide personalization features for the distribution of content media.

In broadcast television systems, a user may register with a distributor such as a multichannel video programming distributor (MVPD). The MVPD may be any service provider that delivers media content programming services. The MVPD may provide the media content over various communication media such as direct-broadcast satellite (DBS), cable, fiber optics, etc. The MVPD may also utilize linear and non-linear distribution models. For example, in the linear distribution model, the playout system may assemble and output (i.e., push) a continuous media content stream from a linear playlist, a graphics system, and a file system of video assets such as programming and advertisements. Accordingly, in the linear distribution model, the user must watch the desired media content at the particular time it is offered on a particular channel within the MVPD channel lineup. The continuously output media content stream may be either transmitted to the MVPD via satellite, fiber, Ethernet, other computer networks, etc. or run through a network live stream encoder for over-the-top (OTT) delivery via a content delivery network (CDN). Those skilled in the art will understand that the OTT delivery may relate to delivery of the media content over the Internet. Those skilled in the art will also understand that the CDN may be any geographically distributed system of network components deployed to distribute the data of the media content. However, this approach may have inherent inefficiencies such as repeated content being transmitted repetitively causing an inefficient use of bandwidth, requiring dedicated playout infrastructure and distribution bandwidth for alternate time zone feeds, requiring a separate system to separately distribute video-on-demand versions of media content, utilizing a common graphics layer for an entire audience, high costs associated in introducing new channels including playout servers and transmission thereof, etc.

In the non-linear distribution model, the playout system may have media content assets stored or retrievable in various storage locations. When the media content is requested, the playout system may determine where the media content is stored, retrieve the media content, and transmit the media content to the user such as in a streaming format. For example, the media content may be stored and retrieved via the CDN. Accordingly, the non-linear distribution model may relate to advanced, non-traditional mechanisms of presenting media content programming. A specific form of non-linear distribution model media content distribution is video-on-demand (VOD). A VOD system may enable the user to request available media content at a time of the user's choosing (i.e., pull) rather than having to watch at a specific broadcast time as with the linear distribution model. With regard to television broadcasts, a VOD system may stream content through a variety of devices such as a set-top box, a computer, a smartphone, a tablet, etc. A user may view the desired media content at any time, such as the user selecting the media content and beginning the playback on a television set almost instantaneously (when streaming) or initiating downloading for viewing at a later time. One manner of transmitting the desired media content through VOD may utilize Over-the-Top (OTT). OTT may relate generally to delivering media content over a network such as the Internet without involvement of the distributor. In contrast, the producer of the media content or another third party may provide the media content where the Internet is only used for delivery of the media content. Again, the distribution of the media content such as over the Internet may be performed over the CDN. As noted above, the distributor may provide such an option but utilizes a separate system for this functionality (e.g., via the set-top box). With the non-linear distribution model, the distributor may be required to only provide the media content upon request in contrast to a linear distribution model where the distributor is continuously transmitting the stream perpetually whether or not the user is requesting or tuned into the programming. This "on-use" aspect of the non-linear distribution model may provide the aforementioned feature of lower costs.

Although the non-linear distribution model may enable lower costs associated with providing the media content, conventional television broadcast still utilizes the linear distribution model. Thus, media content is assembled in a known order, advertisements are inserted appropriately in the media content, graphics are rendered with the media content (e.g., advertisements of shows that will play at a subsequent time), the media content is encoded based upon the transmission medium, and transmitted to a user such as via a set-top box. However, in view of the advantages such as the cost efficiency, the exemplary embodiments provide a hybrid media content distribution arrangement where a virtual linear playout is provided in which aspects of the non-linear distribution model are utilized but appears as a linear distribution model to the user viewing the media content.

FIG. 1 shows a system 100 according to the exemplary embodiments. The system 100 may utilize features of both a linear distribution model and a non-linear distribution model in providing the virtual linear playout for a user. The system 100 may also include additional features that may be incorporated from the introduction of the virtual linear playout such as personalization features. The system 100 may include a distribution system 102 including origination services 105, a personalization server 130, an advertisement server 135, a live event server 140, a distribution cache 142, a communications network 145, assembly services 147, a content delivery network 149, and a media player 150. It should be noted that the system 100 is shown with connections between the components. However, those skilled in the art will understand that these connections may be through a wired connection, a wireless connection, interactions between integrated components or software subroutines, or a combination thereof.

The origination services 105 may be a component in the system 100 that provides a portion of the functionalities associated with an origination facility. In a first functionality, the origination services 105 may determine a schedule of programming or media content intended for the media player 150. In a second functionality, the origination services 105 may determine and/or generate graphics to be included within the media content. In a third functionality, the origination services 105 may manage the content media to be used in the schedule. In a fourth functionality, the origination services 105 may perform pre-flight services with regard to the media content intended for the media player 150. It is noted that the functionalities being performed may be initiated at prescribed time intervals to prepare (pre-flight) the channel for distribution via the assembly services 147 and the media player 150.

The first functionality of the origination services 105 may be performed via a scheduling module 110. The scheduling module 110 may be configured to determine a programming schedule in which a plurality of content (e.g., video, graphics, and interactivity) is scheduled into a predetermined order such that each of the media content is played through the media player 150 at a predetermined time on a predetermined television channel. The programming schedule may be substantially similar to one used in a purely linear distribution model. The scheduling module 110 may also determine or receive inputs as to incorporating one or more advertisements within a particular media content. Thus, the scheduling module 110 may determine which advertisements are to be included within or between particular media content as well as when the determined advertisements are to be included within or between the particular media content. Additionally, the scheduling module 110 may specify targeting parameters for digitally served advertisements that are inserted downstream by the assembly services 147.

The programming schedule of the exemplary embodiments generated by the scheduling module 110 may further include additional information such as metadata for use by the media player 150. The additional information may be a playlist that indicates an order of fragments that are to be combined to generate the media content as a whole. That is, each media content (e.g., an episode of a television show) may comprise a plurality of fragments. For example, a 30-minute television show may include four show fragments where each show fragment may be of the same or different lengths. In a specific embodiment, the show fragments may be configured such that advertisements may be included between the show fragments. Thus, there may be three advertisement fragments inserted between the four show fragments. Therefore, the 30-minute television show may include seven total fragments. The playlist may therefore indicate that the playout of the media content is to play a first show fragment, a first advertisement fragment, a second show fragment, a second advertisement fragment, a third show fragment, a third advertisement fragment, and a fourth show fragment. It is noted that the inclusion of the advertisement fragments may have been determined in the manner described above through the functionality of the scheduling module 110. Thus, the origination services 105 via the scheduling module 110 may generate the programming schedule for the media player 150. As will be described in detail below, the programming schedule may provide a base schedule in which modifications may be performed thereto. As used herein, the playlist may also represent a manifest of the media content including the fragments of the show as well as the advertisements.

The playlist may be substantially similar to one used in a purely non-linear distribution model, specifically a VOD model. It should be noted that the media content may be delivered complete or may be segmented into any number of fragments to increase efficiency of downloading, seeking, etc. The fragments may be provided automatically or as requested. For example, the playlist may be utilized by the media player 150 to determine a fragment of the media content that is required. The fragment may be requested and received by the media player 150. In another example, the system 100 may determine that the media player 150 is still playing out the selected media content such that the subsequent fragment may be automatically provided.

It should be noted that each fragment may also include a plurality of sub-fragments. For example, the advertisement fragment may include a plurality of sub-fragments where the advertisement fragment may be a two-minute duration and each sub-fragment may be four commercials each of 30-second duration. In another example, the show fragment may also include a plurality of sub-fragments where the show fragment may extend beyond a predetermined time limit to warrant at least one segmentation thereof.

The second functionality of the origination services 105 may be performed via a graphics module 115. The graphics module 115 may be configured to determine and/or generate graphics to be included within the media content. In a first example, the graphics may be a stationary or animated visual representation that is used and removed. In a second example, the graphics may be a persistent visual representation shown within an overall view (e.g., along a bottom edge) that displays information such as in a scrolling manner. For example, the graphics may be visual features superimposed over the media content, such as a persistent channel logo. The graphics may be used for a variety of purposes. For example, the graphic may be an update such as being news related, event related, etc. In another example, the graphic may be an advertisement such as for a television show that airs at a later time on the same or different channel. The graphics module 115 may also select media content as well as determine when, where, and how the graphic is to be used in the media content and more specifically, in the fragment of the media content. In this manner, when the fragment of the media content is requested/transmitted to the media player 150, the graphic may also be transmitted for playback when the association has been established.

It should be noted that the media content and the fragments that comprise the media content as well as further features such as the advertisement fragments and the graphics may be stored in a variety of locations. In a first example, the data corresponding to these aspects may be stored locally (on a memory arrangement of the services 105) or substantially locally (within an intranet of the services 105). Accordingly, the data may be stored until requested or automatically provided. In a second example, the data corresponding to these aspects may be stored in remote locations such as content repositories in a physically separate location relative to the origination services 105. In a particular embodiment, the media content may be stored in content repositories of the producers, the advertisements may be stored in content repositories of the advertiser, graphics may be stored in content repositories of the distributor, etc. The source managing the content repositories may provide access to the various content repositories for retrieval of desired data. The content repositories may be components included in the CDN 149.

The third functionality of the origination services 105 may be performed via a media asset manager 120. The media asset manager 120 may be configured to manage the media content to be used in the programming schedule. The media asset manager may be more generally related to digital asset management which relates to management tasks and decisions regarding ingestion, annotation, cataloging, storage, retrieval and distribution of assets such as media content. The media content may be managed and stored in digital format using any format compatible with the system 100 and particularly with the media player 150. However, it is noted that the digital format may be a generic format or one that is translated or encoded into a different format (e.g., corresponding to the format used by the media player 150).

The aspects of digital asset management corresponding to media asset management may be addressing audio, video, etc. As described above, the exemplary embodiments may incorporate features of non-linear distribution models. The media asset manager 120 may be configured for substantially similar functionalities as used in a linear distribution model but may also be configured for use with the media content, the fragments, the graphics, etc. However, one particular feature of the media asset manager 120 is the use of decoders as well as the input and output used for the ingest, use, and playout of the media content. As discussed above, there may be metadata that is used by the media player 150. The metadata may describe the essence of the media content that serve as a guide to decoding and transcoding the media content as well as access rules. That is, the essence of the media content may be treated as a nondescript storage object unless accessed for viewing or editing.

The media asset manager 120 may store media in a variety of different ways such as with a library asset management system, a production asset management system, a cloud based digital asset management system, etc. In this manner, the media asset manager 120 may determine an organization of the data corresponding to the media content, the advertisements, the graphics, etc.

The fourth functionality of the origination services 105 may be performed via a distribution module 125. The distribution module 125 may be configured to perform pre-flight services with regard to the media content intended for the media player 150. The pre-flight services may relate to operations performed in preparing the media content and further features for playback on the media player 150. In a first example, the distribution module 125 may perform pre-flight operations for the programming schedule for a channel that will be requested from the media player 150. The distribution module 125 may convert traditional linear programming schedules and logs provided by the scheduling module 110 to a virtual programming schedule format required by the assembly services 147. In a second example, the distribution module 125 may perform pre-flight operations for the media content and the graphics. As will be used herein, the pre-flight operations of the media content may include the audio and visual (A/V) assets associated with the selected show and the advertisements included in the show. The pre-flight operations of the graphics may entail graphics assets. Those skilled in the art will understand that the pre-flight operations may relate to the process of confirming that the data that is to be associated with the requested programming is properly prepared and published to distribution cache 142 such that the media player 150 requests the proper data from the CDN 149 for eventual display. The distribution module 125 may perform Hypertext Transfer Protocol (HTTP) Live Streaming (HLS) pre-packaging such as once per pre-recorded program and shared with the VOD component (as may be used with the media asset manager 120), converting and packaging streaming scalable vector graphics (SVG) (as provided by the graphics module 115), performing media content pre-publishing (as provided by the media asset manager 120), etc. Thus, prior to transmission of the data including the media content, the graphics, the advertisements, etc., the distribution module 125 may perform respective operations thereto.

The personalization server 130 may be configured to provide personalization features for the media player 150. According to the exemplary embodiments, the personalization server 130 may initially determine an identity of the media player 150 and/or a user utilizing the media player 150. Based upon this identification, the personalization server 130 may further determine the personalization features to be provided with the media content, graphics, advertisements, etc. To associate the personalization features, the personalization server 130 may receive or determine information of the media player 150 or the user utilizing the media player 150. For example, biographical information may be provided from the media player 150 where the biographical information may be manually provided by the user or provided automatically utilizing information received when registering with the MVPD. In another example, viewing habits may be monitored on the media player 150 in which the media player 150 may transmit the viewing habit information to the MVPD or the personalization server 130 (the monitoring being an automatic process, manually accepted process, etc.). Further considerations may be used in determining the personalization features.

The personalization features may include a variety of different types. In a first example, the personalization feature may be used on the programming schedule. As discussed above, the scheduling module 110 may generate the programming schedule that forms a basic schedule for the media player 150. That is, when no personalization features are included, the programming schedule generated by the scheduling module 110 may be used as is. According to the exemplary embodiments, the personalization server 130 may determine whether a media content slot in the programming schedule may be replaced with a different media content that the user of the media player 150 has a higher probability of enjoying or watching. As discussed above, through the incorporation of the non-linear distribution model with regard to retrieval of media content in contrast to an unchangeable continuous stream of the linear distribution model, any portion of the programming schedule may be altered since the media content is retrieved when requested. That is, only the programming schedule need be changed with no requirement of changing a continuous stream or generating a new stream to accommodate the change.

Although the personalization server 130 may instruct the assembly services 147 to change the programming schedule in any way such as replacing any media content with any other media content, the personalization server 130 may instruct changes to the programming schedule in defined manners. In one defined manner, the change may be made while maintaining a genre of the media content. For example, a first children's cartoon may be slated on a selected channel at a selected time. The personalization server 130 may determine that the slated children's cartoon in the programming schedule is not viewed by the user of the media player 150. Specifically, the likelihood of the slated children's cartoon being viewed may be below a first probability threshold. However, the user of the media player 150 often views a second children's cartoon. Specifically, the likelihood of the second children's cartoon being viewed may be above a second probability threshold. The personalization server 130 may personalize the programming schedule to replace the first children's cartoon with the second children's cartoon. It is noted that other factors may be considered in the replacing operation such as selecting a replacement show that has substantially similar age appropriate content or material as the replaced show. In another defined manner, the change may be made to defer a desired show to air at a later time (but may not allow a show to air earlier). The personalization server 130 may receive information that the user of the media player 150 uses a VOD application (e.g., on a tablet) to watch the desired show at a known later time due to reasons that prevent the user from viewing the desired show at the slotted time in the programming schedule. The personalization server 130 may replace whichever show is slotted in the known later time with the desired show. In this way, the personalization feature may adjust the programming schedule to a personalized programming schedule. With the personalized programming schedule being generated prior to delivery to the media player 150, a virtual linear playout may be accomplished where the user believes that a linear distribution model is being provided.

In a second example, the personalization feature may be used on the graphics. As discussed above, the graphics module 115 may generate graphics that may be shown over the media content such as the show fragment (and potentially over the advertisements). According to the exemplary embodiments, the personalization server 130 may instruct the assembly services to replace a given graphic to be shown with a personalized graphic that may target the user of the media player 150. For example, the graphic may be an advertisement for a show airing at a subsequent time on the same channel. However, the personalization server 130 may have information that the user of the media player 150 does not watch the show. Thus, the personalization server 130 may replace the graphic with a different one that is more appropriate for showing to the user of the media player 150 (e.g., a show known to be watched by the user of the media player). In another example, the graphic may be a scrolling ticker disposed along an edge of the view that shows various information such as localized concert tour dates, subsequent programming, etc. The information to be included in the ticker may be personalized or catered for the user of the media player 150 such as showing the weather of a local area in which the media player 150 is located.

In a third example, the personalization feature may be used on the advertisements. As discussed above, the personalization server 130 may receive information related to the media player 150 and/or the user of the media player 150. In addition, during the media content being presented, advertisements may also be included such as with the advertisement fragments between the show fragments of the media content. The programming schedule may have set the advertisement fragments to be used in the media content. Thus, with no changes, the predetermined advertisements may be used while the media content is being shown. However, a more targeted advertisement scheme may be utilized from the personalization server 130. For example, there may be further advertisements or local advertisements that may replace select advertisements that the personalization server 130 has determined is of little to no interest to the user of the media player 150.

It should be noted that the personalization features corresponding to a user may be further refined. That is, the media player 150 may be used by one or more users. Through any mechanism of determining the identity of the user (e.g., login credentials, facial recognition mechanism, etc.), the personalization features may further be defined by an exact identity of the user. Accordingly, the exemplary embodiments may be configured to provide the personalization features based upon the media player 150, a user associated with the media player 150 (e.g., a registered user identity), an identity of the user using the media player 150, and/or a combination thereof. For example, if a user associated with the media player 150 is also identified, the personalization features may be selected accordingly. In another example, if a user not associated with the media player 150 is identified, a default setting may be used such as the general programming schedule or the personalized programming schedule as related to the media player 150. In a further example, the personalization server 130 may have access to an identity repository such that any user included in the identity repository may be determined through any media player 150 and the personalization features may be provided wherever the user has been identified.

The advertisement server 135 may be configured to provide the advertisements either in the media content or through the graphics. In a substantially similar manner of the media content being available in various repositories, the advertisement server 135 may manage the retrieval of advertisements such as from advertisement repositories that may be included in the CDN 149. Particularly in view of advertisements being changed more often, the advertisement server 135 may track the available advertisements for use in the media content. Accordingly, when the request for the media content is received and the media content is provided, the corresponding advertisement via the graphics or the advertisement fragments may also be retrieved either in a general manner or in a personalized manner.

The live event server 140 may be a separate component or an integrated component of the origination services 105. The system 100 is illustrated where the origination services 105 manages the scheduling of all programs, but only manages the origination of pre-recorded programs. The live event server 140 may be configured for managing the origination of live or minimal delay programs. Thus, in contrast to the pre-stored media content and its fragments, the live event server may provide a stream of live fragments to show the live event such as a sporting event, a concert event, a live news event, etc. Specifically, the live event server 140 may be an HLS or Moving Picture Experts Group (MPEG) Dynamic Adaptive Streaming over HTTP (DASH) (MPEG-DASH) streaming encoder and packager. With regard to the programming schedule, the graphics, the personalization features, and the advertisements according to the exemplary embodiments, the live programs provided via the live event server 140 may operate in a substantially similar manner as the origination services 105. Furthermore, the data of the live stream may also be provided via the CDN 149.

The distribution cache 142 stores the materials published by the distribution module 125 during the preflight process. The cache may contain a representation of any storage component of the distribution system 102, transformed for optimal delivery to the assembly services 147 and media player 150. The distribution cache 142 may operate in conjunction with the media asset manager 120 via the CDN 149. Specifically, the distribution cache 142 may temporarily store the A/V assets and/or the graphics assets prior to delivery to the media player 150. As there may be a plurality of media players, a requested asset may be stored on the distribution cache 142. In such a scenario, a media player that is requesting the same asset may retrieve the asset from the distribution cache 142 rather than from the repository. This may provide a more efficient delivery of the asset and decrease any processing and transmission requirements for the asset.

The communications network 145 may be any type of network that enables data to be transmitted from a first device to a second device where the devices may be a network device and/or an edge device that has established a connection to the communications network 145. For example, the communications network 145 may be the public Internet, a local area network (LAN), a wide area network (WAN), a virtual LAN (VLAN), a Wi-Fi network, a cellular network, a cloud network, a wired form of these networks, a wireless form of these networks, a combined wired/wireless form of these networks, etc. The communications network 145 may also represent one or more networks that are configured to connect to one another to enable the data to be exchanged among the components of the system 100. In a more particular embodiment, the communications network 145 may be the transmission medium that enables the above described components of the origination services 105, the personalization server 130, the advertisement server 135, the live event server 140, and the distribution cache 142 to exchange data with each other particularly with regard to the pre-flight operations for the programming schedule, the A/V assets, and the graphics assets. The communications network 145 may also include network components (not shown) that are configured to perform further functionalities in addition to providing a conduit to exchange data.

The assembly services 147 may be at the core of the system 100, residing on the communication network 145. The assembly services 147 may respond to streaming requests from the media player 150 and assemble the elements provided by the origination services 105, the live event server 140, the personalization server 130, and/or the advertising server 135 into a continuous stream of video, advertising, and graphics commands, adjusted appropriately for the end user's environment (e.g., territory and time zone). Specifically, the assembly services 147 may assemble the results of the pre-flight operations of the scheduling module 110, the graphics module 115, the media asset manager 120, and the distribution module 125, mixing in live event streams provided by the live event server 140. Accordingly, the media player 150 that transmitted the request for which the pre-flight operations are performed may receive the results of the pre-flight operations associated with the programming schedule, the A/V assets, and the graphics assets from the assembly services 147.

As described above, the CDN 149 may be a geographically distributed system of network components that enables data exchange such as over the Internet. The CDN 149 may include the above noted repositories of the data corresponding to the media content, the advertisements, and the graphics. Thus, when the media player 150 transmits a request for a user-selected programming, the CDN 149 may provide the requested data corresponding to the selected media content. In the event that the requested data is not edge-cached at the CDN (a cache miss), the CDN will request the data from the media distribution cache 142. As will be described in further detail below, the media player 150 may also request additional data corresponding to the advertisements and graphics based upon the information received from the results of the pre-flight operations of the programming schedule, the A/V assets, and the graphics assets.

The media player 150 may be any component used by the user who views the media content such as on a television, a tablet, a personal computer, a laptop, a mobile device, a game console, etc. The media player 150 may be configured to perform a variety of operations such that the media content is shown properly. Initially, the media player 150 may have operations that are substantially similar to a set top box or an HTML-based media player. Those skilled in the art will understand that the set top box may be an information appliance device that includes a tuner that connects to a television that converts the signal in which the media content is being received for proper display on the television. The distribution system 102 may be satellite based, cable based, fiber optic based, etc. Accordingly, the media player 150 may convert the respective signal for display. It should also be noted that the media player 150 may be any attachment or incorporated component of a display configured to perform the noted functionalities.

Figure 2:
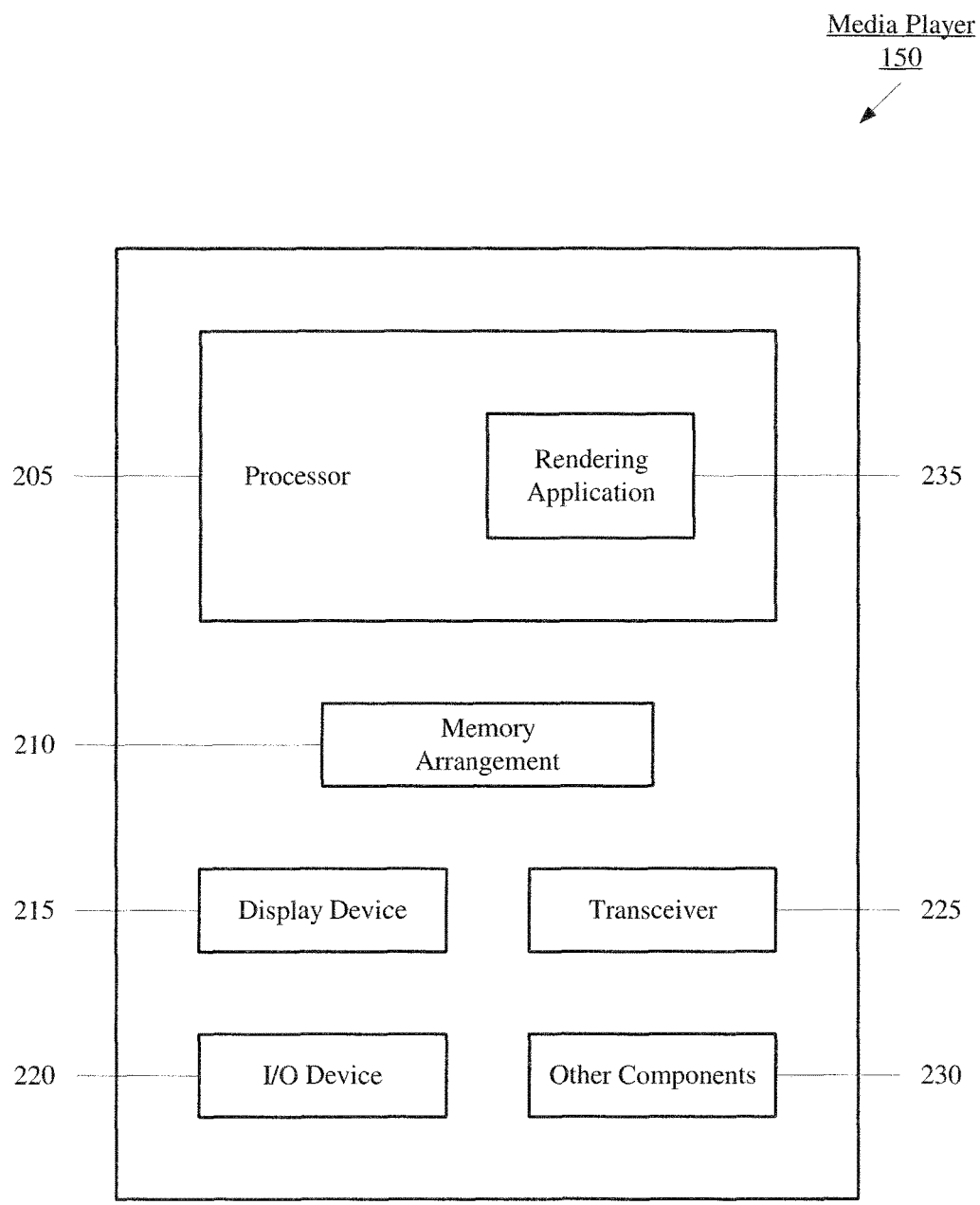
FIG. 2 shows a media player according to the exemplary embodiments.

The media player 150 may also perform a variety of different operations. These operations may be passive with no user intervention or active where the user provides inputs. FIG. 2 shows the media player 150 of FIG. 1 according to the exemplary embodiments. Again, the media player 150 may be substantially similar to a set top box. However, it is noted that the media player 150 may be any device that is configured to receive the media content as well as the accompanying data and capable of showing the media content to the user. Accordingly, the media player 150 may be a physical component that is separate or incorporated into a display device or may be a virtual component such as embodied in as an application that is executed by the display device. The media player 150 may include a processor 205, a memory arrangement 210, a display device 215, an input/output (I/O) device 220, a transceiver 225, and other components 230 (e.g., an audio input device, an audio output device, a battery, a data acquisition device, ports to electrically connect the media player 150 to other electronic devices, etc.).

The processor 205 may be configured to execute a plurality of applications of the electronic device 130. For example, the processor 205 may execute a rendering application 235 that may include a display portion that converts (via a tuner) the incoming signal of the media content to a format used for displaying the media content and an audio portion that converts the incoming signal of the media content to a format used in playing back an audio of the media content. The rendering application 235 may further include operations of receiving inputs that request information and data for the user. As will be described in further detail below, the rendering application 235 may request a user-selected programming and request the data corresponding to the user-selected programming from the CDN 149 based upon information included in manifests generated from the pre-flight operations for the programming schedule, the A/V assets, and the graphics assets.

It should be noted that the above noted application being an application (e.g., a program) executed by the processor 205 is only exemplary. The functionality associated with the applications may also be represented as a separate incorporated component of the media player 150 or may be a modular component coupled to the media player 150, e.g., an integrated circuit with or without firmware.

The memory arrangement 210 may be a hardware component configured to store data related to operations performed by the media player 150. Specifically, the memory arrangement 210 may store the media content and other data being received for use by the rendering application 235. The display device 215 may be a hardware component configured to show data to a user. With regard to the media player 150, the display device 215 may be a converter or tuner that established a connection to a display such as a television. The I/O device 220 may be a hardware component that enables the user to enter inputs. The media player 150 may include input receivers for direct use by the user on the media player 150 or may include short-range receivers such as a remote control that receives the inputs from the user. The transceiver 225 may be a hardware component configured to transmit and/or receive data in a wired or wireless manner. Specifically, the transceiver 225 may be used with the communications network 145.

According to the exemplary embodiments, the user may utilize the media player 150 to watch desired media content. Initially, the user may activate the media player 150 such as via the I/O device 220. When the media player 150 is activated, the media player 150 may receive a channel lineup. For example, upon activation, the media player 150 may be set to return to a previous channel when the media player 150 was previously deactivated or preset to a selected channel. Accordingly, the media player 150 may request a streaming manifest for the selected channel upon activation. The media player 150 may subsequently request further streaming manifests for the channel when the previous streaming manifest is expiring or about to expire (e.g., programming for the channel continues to play out beyond the streaming manifest that has been provided thus far) or for a streaming manifest for each channel that is selected. As discussed above, the streaming manifest may include the information indicating how the media player 150 is to request the media content including the A/V assets as well as the graphics assets from the CDN 149. Specifically, the streaming manifest for a channel may include a playlist that indicates the fragments that are to be requested from the CDN 149 and displayed for playout. Specifically, the playlist may include identifiers of the A/V assets and the graphics assets.

Thus, in an initial step, the media player 150 may receive a request for a channel from the user or determine the current channel for which playout is to be performed. The media player 150 may generate a request to be transmitted to the assembly services 147 for the programming associated with the channel. For example, the media player 150 may utilize the communications network 145 and the type of connection the assembly services 147 utilizes with the media player 150 (e.g., cable, fiber, satellite, etc.) to transmit the request.

Upon receiving the request, the assembly services 147 and the CDN 149 may respond to the request from the media player 150. As described above, the media player 150 initially transmits the request to the assembly services 147 for a currently selected channel on the media player 150. Once the request has been received, the assembly services 147 may accordingly perform a plurality of operations using preflight information received from the distribution module 125, the distribution cache 142, the personalization server 130, the advertisement server 135, and the live event server 140. Specifically, the assembly services 147 may stitch together a streaming manifest for the media player 150, leveraging information published by the distribution module 125 preflight processes. Accordingly, the assembled A/V manifest and graphics manifest may be forwarded to the media player 150 in response to the request for the selected channel.

The assembly operation for the programming schedule may also include a plurality of sub-steps to be performed by the assembly services 147. As an initial operation, the request from the media player 150 may include user information. Thus, the user information may be used to authenticate the user. The authentication of the user may provide a security mechanism but may also be used as a basis to provide personalization features. Specifically, an identity of the user may be provided to the personalization server 130 for personalizing the programming schedule, the advertisements, and/or the graphics. As noted above, the personalization may be based upon prior viewing history, demographic information of the identified user, geographic location of the identified user, etc. With particular regard to the A/V assets, the personalization server 130 may determine whether personalized programming is to be included. For example, as discussed above, the programming schedule may utilize a predetermined ordering of shows for playout during a broadcast day. However, the personalization feature may replace a show with a different show relative to the identified user. The advertisements may also be personalized in this manner. In this manner, the programming schedule may be personalized and a manifest of the schedule may be generated. Specifically, the manifest of the programming schedule may include the ordering of the shows and the advertisements and the corresponding metadata for these A/V assets such as the identifiers. Subsequently, the manifest of the programming schedule may be transmitted from the assembly services 147 to the media player 150.

The assembly operation for the A/V manifest may also include a plurality of sub-steps to be performed by the assembly services 147. The A/V manifest may relate to the data to be retrieved by the media player 150 for the programming of the selected channel to be shown in the playout on the display device 215. Initially, the assembly services 147 may determine a position in the programming schedule to which the current request corresponds. For example, the time and date of the request may indicate the position in the programming schedule. The assembly services 147 may determine whether the show is a pre-recorded show or a live show. Based upon whether the show is pre-recorded or live, an appropriate manifest for the show and the data to be retrieved by the media player 150 may be generated for the media player 150. For example, if pre-recorded, the A/V assets published by the distribution module 125 during the preflight process may be used in determining the manifest for the pre-recorded show. In another example, if live, the live event server 140 may be used in determining the manifest for the live show. Since the A/V assets are being determined, the assembly services 147 may further determine whether the show is currently in an advertisement break to generate a manifest for the advertisement. While in the advertisement break, the A/V manifest generated for the show may be updated (e.g., stitched) with the manifest for the advertisement. Therefore, the assembly services 147 may generate a stitched A/V manifest that identifies the fragments or data for the show and the advertisements that the media player 150 is to retrieve from the CDN 149. In the event that the CDN 149 has not cached the A/V assets on its servers, the CDN 149 will fetch the A/V assets from the distribution cache 142. The stitched A/V manifest may be transmitted from the assembly services 147 to the media player 150.

The assembly operation for the graphics manifest may also include a plurality of sub-steps to be performed by the assembly services 147. The graphics manifest may relate to the data to be retrieved by the media player 150 for the graphics assets that are shown with the A/V assets. Initially, the assembly services 147 may also determine the position in the programming schedule the current request corresponds. Based on this position, the graphics manifest may determine which graphics are to be included in the manifest. The assembly services 147 may also determine whether the show is in an advertisement break. While in an advertisement break, the graphics may be prevented from being included in the advertisements. However, while the show is running, the graphics may be included. The personalized graphics or standard graphics may be included in the graphics manifest bound for the media player 150. The graphics manifest may be transmitted from the assembly services 147 to the media player 150.

While the pre-flight operations are being performed to generate the manifests of the programming schedule, the A/V assets, and the graphics assets, the distribution system 102 will process the assets (performing transcoding, stream packaging, and format conversions) and publish the assets to the distribution cache 142. For example, the linear programming schedule may have identified the data that is to be shown for the playout at the media player 150. The distribution module 125 may utilize these identifiers for the A/V assets and the graphics assets, run preflight media operations, and place the corresponding data into the distribution cache 142 awaiting retrieval by the media player 150 when a subsequent request is received for this data. That is, the distribution module 125 may prepare for the distribution of the data for the assets by publishing the assets to the distribution cache 142 prior to the manifests being generated and transmitted to the media player 150 in response to user requests to view a channel.

Once the pre-flight operations are performed and the assets are published to the distribution cache 142, the media player 150 may receive the results of pre-flight operations performed by the distribution system 102 and the assembly operations performed by the assembly services 147. Specifically, the media player 150 may receive the assembled A/V and graphics manifests. The media player 150 may extract the information included in the A/V and graphics manifests, to transmit a request to the CDN 149 that serves the A/V assets and the graphics assets. Specifically, the stitched manifests provide an ordering of how the A/V assets and the graphics assets are to be displayed for playout. The media player 150 may continually request stitched manifests from the assembly services 147, and the A/V assets and the graphics assets from the distribution cache 142 and/or the CDN 149 for as long as the media player is to continue playout of the selected channel. Once the A/V assets and the graphics assets are received, the media player 150 may perform the appropriate rendering operation (e.g., scaling, placement, frame rate conversion, etc.) such that the A/V assets and the graphics assets are properly shown on the display device 215 based upon the ordering indicated in the programming schedule. For example, the media player 150 may measure available bandwidth and adjust an A/V bitrate for the A/V assets. In another example, the media player 150 may render the SVG or other such graphic at a display resolution for the graphics assets. In this manner, the media player 150 may assemble the A/V assets and the graphics assets for the playout.

With technologies providing Internet video and graphics streaming emerging, the exemplary embodiments provide a mechanism to shift the manner in how linear distribution models for television broadcasts are assembled and distributed. Manifest-based streaming protocols (e.g., HLS and MPEG-DASH) may provide a portion of the basis upon which to construct linear experiences from pre-recorded assets in a substantially similar way that VOD streaming is performed as in non-linear distribution models. The exemplary embodiments may also be utilized in browser-based graphics support such as streaming scalable vector graphics (SVG) in rendering scheduled and targeted graphics in web browser applications and other native applications. The separation of the graphics stream from the A/V stream allows for repeating airings of a pre-recorded program to use a single cached A/V asset with fresh graphics appropriate for each airing on a specific channel.

Therefore, the exemplary embodiments provide an improved network efficiency. That is, a playout server as is used in a linear distribution model no longer assembles and encodes a continuous video stream. In contrast, a virtual television assembly service may stitch fragments, as used in HLS or MPEG-DASH, to synthesize a live experience. Accordingly, the media content may be pre-published and shared for both linear and VOD purposes. The exemplary embodiments also provide a lower cost origination system. The playout server as is used in the linear distribution model that assembles and encodes streams may be replaced with lower cost systems that only manipulate playlists and metadata. The exemplary embodiments further provide personalization or targeting features. The personalized programming with targeted graphics and personalized advertisements may be mixed into a linear stream. This personalization may also be utilized for time zone shifts where the programming schedule may be maintained and any request for content media does not require further systems such as an entirely different yet redundant distribution system for a feed in a different time zone. The exemplary embodiments still further provide locally rendered graphics. The streaming vector graphics used by the graphics module 115 may be free of video compression artifacts, may be personalizable, targetable, etc., and may be accessible via assistive technologies (e.g., speech to text for the hearing impaired, enlarged text for the visually impaired, etc.). In this manner, the personalization module 130 may incorporate further features, particularly with the graphics.

Figure 3:
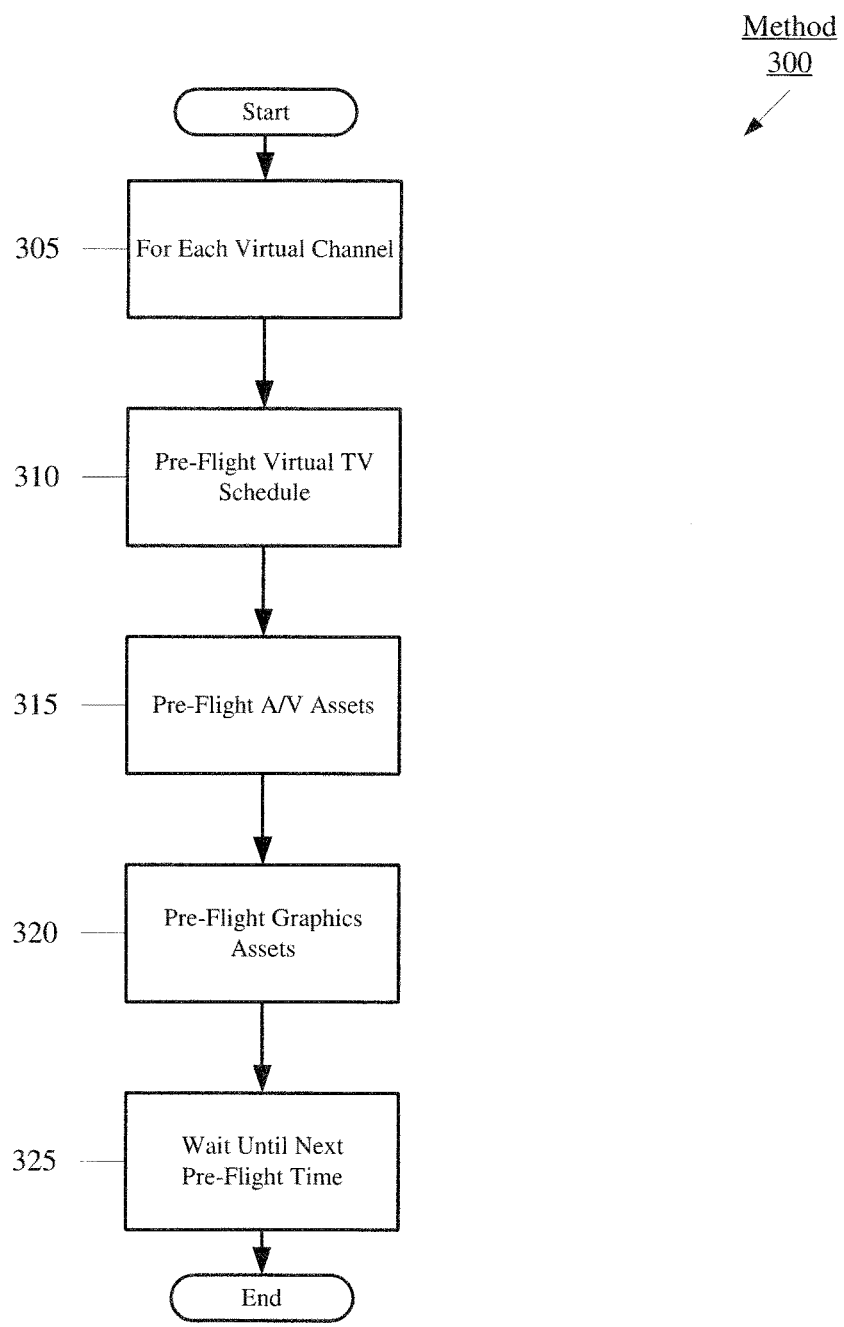
FIG. 3 shows a method of performing a plurality of pre-flight operations according to the exemplary embodiments.

FIG. 3 shows a method 300 of performing a plurality of pre-flight operations according to the exemplary embodiments. Specifically, the method 300 may relate to an overall operation performed by the distribution system 102 at regular intervals to prepare (preflight) a traditional linear channel's assets (schedule, A/V, and graphics) for virtual linear distribution. In step 310, the distribution system 102 performs the pre-flight operations for the Virtual TV schedule, converting the traditional linear TV schedule from a broadcast format such as BXF to a format suitable for the assembly services 147. In step 315, the distribution system 102 performs the pre-flight operations for the A/V assets to transcode them for adaptive bitrate streaming, perform HLS packaging, and publish to the distribution cache 142. In step 320, the distribution system 102 performs the pre-flight operations for the graphics assets, converting to a format such as streaming SVG suitable for the assembly services to perform manifest stitching operations and the media player 150 to render. Transformed graphics are published to the distribution cache 142.

Figure 4:
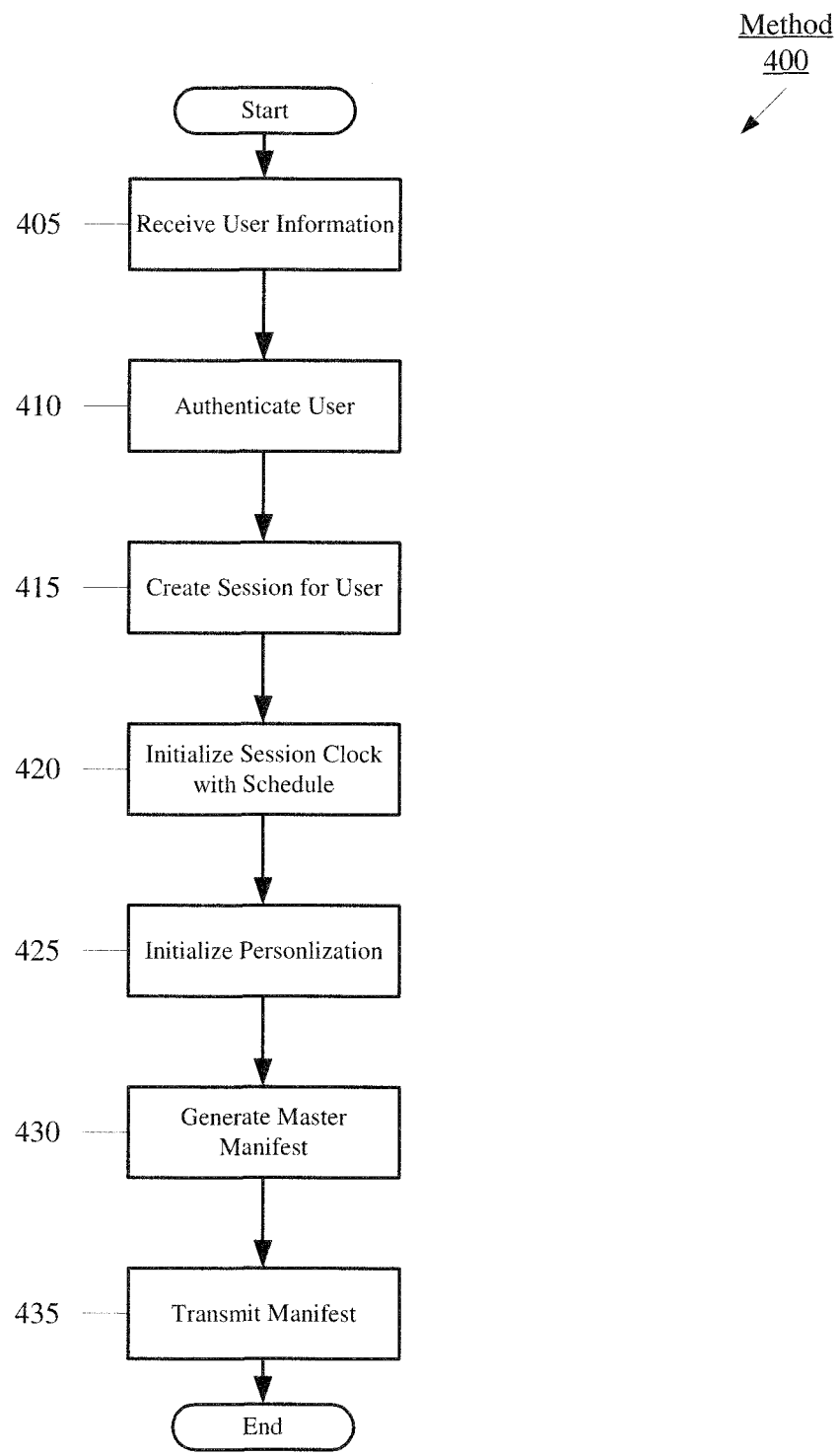
FIG. 4 shows a method of generating a master playback manifest according to the exemplary embodiments.

FIG. 4 shows a method 400 for the assembly services 147 to handle requests from the media player 150 to play channels, generating master playback manifests according to the exemplary embodiments. As discussed above, the programming schedule may represent an ordering of A/V assets including the requested content media of the selected channel and advertisements that may be interspersed therein. Therefore, in a first result of the assembly operations, the manifest of the programming schedule may be provided in response to the request being received from the media player 150. The method 400 will be described with regard to the system 100 of FIG. 1.

In step 405, the assembly services 147 receives user information associated with a user of the media player 150 from which the request was received. Specifically, the request may include an identifier of the media player 150 such that the user information may be determined therefrom. In step 410, the user may be authenticated. For example, the user profile or other user related information may be accessed. In step 415, the assembly services 147 creates a session for the user. The session may relate to the current time period and the user's time zone for which the media player 150 has been activated.

In step 420, the assembly services 147 initializes a session clock of the session with the programming schedule. As discussed above, the exemplary embodiments may utilize a substantially similar generic (non-personalized) programming schedule as a linear distribution model in which the predetermined programming for a broadcast day are included in the generic programming schedule. The initializing of the session clock may be used to determine where in the generic programming schedule the manifest is to be generated. For example, if the request from the media player 150 is received at a specific time and date, the time and date may provide the location within the generic programming schedule. The initializing of the session clock may also provide a mechanism by which time zone delay offsetting features may be provided. For example, the time and date as well as a geographic location of the media player 150 may indicate how to offset the programming schedule for the media player 150 such that the appropriate programming may be identified. Although a common programming schedule may be used for any media player 150, the location within the programming schedule may be identified based upon the time zone delay offsetting through the initializing of the session clock for the session.

In step 425, the assembly services 147 utilizes the personalization server 130 to personalize the programming schedule. Again, the programming schedule for which the previous operations are performed may be to a generic programming schedule that serves as a basis to generate the manifest for the programming schedule to be generated for the media player 150. As discussed above, the personalization features that may be included for the programming schedule may relate to providing targeted programming based upon the user information associated with the user of the media player 150. The targeted programming may also entail replacing a first programming with a second programming where there may be overlapping characteristics between the first and second programming except the user information may indicate that the second programming is more likely to be viewed by the user of the media player 150. In this manner, the generic programming schedule may be personalized.

In step 430, the assembly services 147 generates a master playback manifest, also known as a Master Playlist in the HLS streaming protocol. This master playback manifest is independent of the schedule, simply providing URL references bound to the assembly services session that the media player 150 will use in making subsequent requests for A/V and graphics manifests. In step 435, the assembly services 147 transmits the master playback manifest of the programming schedule to the media player 150.

Figure 5:
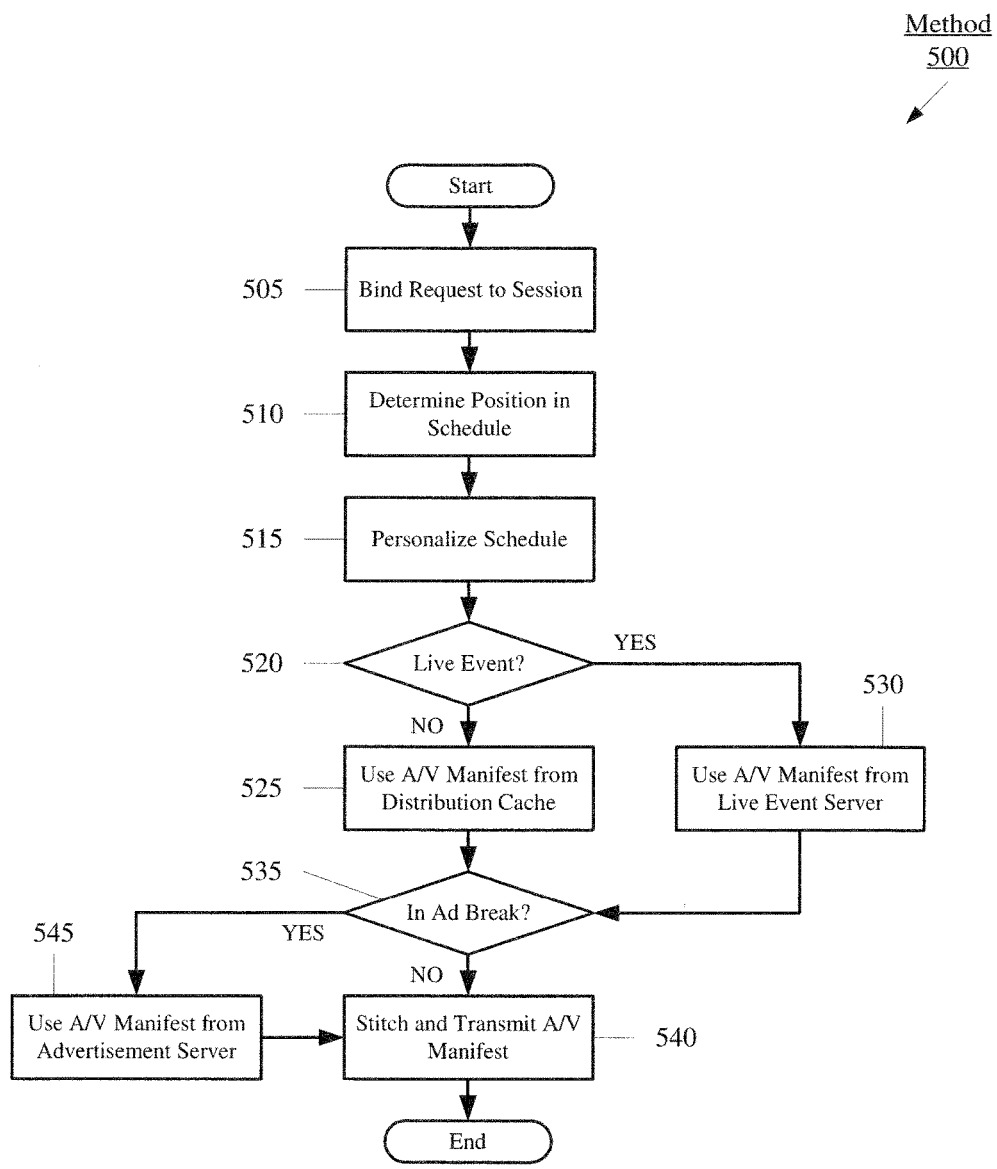
FIG. 5 shows a method of generating an A/V manifest according to the exemplary embodiments.

FIG. 5 shows a method 500 of generating an A/V manifest according to the exemplary embodiments. As discussed above, the A/V manifest may represent how the A/V assets are to be retrieved by the media player 150 for playout on the display device 215. Therefore, in a second result of the pre-flight operations, the A/V manifest may be provided in response to the request being received from the media player 150. The method 500 will be described with regard to the assembly services 147 and distribution cache 142. The method 500 will be described with regard to the system 100 of FIG. 1.

In step 505, the assembly services 147 may bind the request received from the media player 150 to the session (e.g., as created in step 415 of the method 400 of FIG. 4). Accordingly, the media player 150, the session, and the request may be associated with one another. In step 510, the position in the programming schedule may be determined. Specifically, the time and date of the request may be used as the basis upon which to determine the location within the programming schedule, more specifically, the personalized programming schedule as related to the manifest of the programming schedule that is prepared for the media player 150.

In step 515, the personalization features for the A/V assets in the programming schedule may be performed. The personalization of the programming schedule may relate to the initialization of the personalization features. One aspect of the personalization features is related to the A/V assets. Thus, through information provided by the personalization server 130, the assembly services 147 may determine the programming that may be personalized as well as the advertisements that may be personalized.

In step 520, the assembly services 147 determines whether the programming in the position in the programming schedule corresponds to a live event. If the programming corresponds to a pre-recorded program, in step 525, the assembly services 147 may identify the A/V assets for the programming in the distribution cache 142 and/or CDN 149. However, if the programming corresponds to a live program, in step 530, the assembly services 147 may identify the A/V assets for the programming in the live event server 140.

In step 535, the assembly services 147 determines whether the programming is in an advertisement break or includes advertisement breaks. If the programming is not in an advertisement break or if no advertisements are to be included, in step 540, the A/V manifest is generated (stitching content manifests as needed) and transmitted to the media player 150. It is again noted that the A/V manifest may be stored in the distribution cache 142 prior to delivery to the media player 150 via the CDN 149. However, if the programming is in an advertisement break, the assembly services 147 uses the advertisement server 135 to determine the advertisement(s) to be included in the A/V manifest such as personalized advertisements as indicated by the personalization server 130. Specifically, in step 545, the assembly services 147 may utilize the advertisement server 135 to identify the A/V assets for the advertisements. For example, as described above, the scheduling module 110 may have specified the targeting parameters for digitally served advertisements. In this manner, in step 545, the assembly services 147 may identify these digitally served advertisements via the targeting parameters. Therefore, the downstream insertion may be performed by the assembly services (e.g., in step 540).

Figure 6:
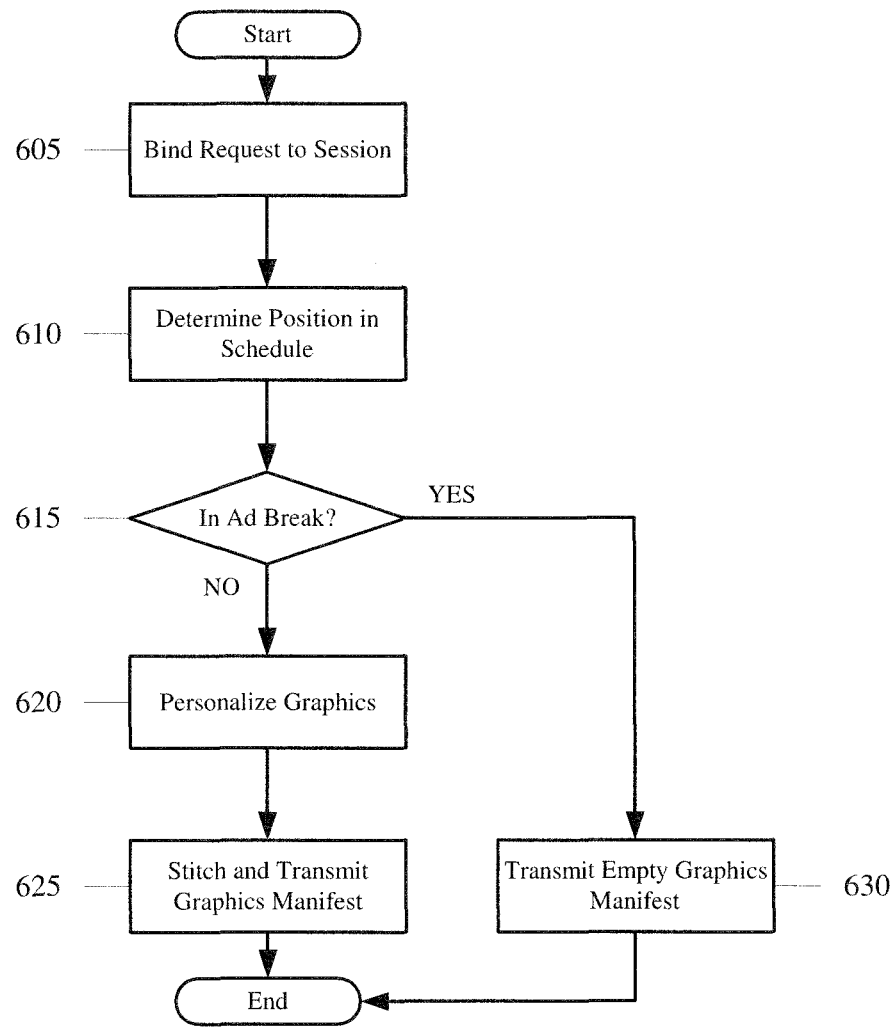
FIG. 6 shows a method of generating a graphics manifest according to the exemplary embodiments.

FIG. 6 shows a method 600 of generating a graphics manifest according to the exemplary embodiments. As discussed above, the graphics manifest may represent how the graphics assets are to be retrieved by the media player 150 for inclusion in the playout with the A/V assets on the display device 215. Therefore, the graphics manifest may be provided in response to the request being received from the media player 150. The method 600 will be described with regard to the assembly services 147 and distribution cache 142. The method 600 will be described with regard to the system 100 of FIG. 1.

In step 605, the assembly services 147 may bind the request received from the media player 150 to the session (e.g., as created in step 415 of the method 400 of FIG. 4). Accordingly, the media player 150, the session, and the request may be associated with one another. In step 610, the position in the programming schedule may be determined. Specifically, the time and date of the request may be used as the basis upon which to determine the location within the programming schedule, more specifically, the personalized programming schedule as related to the manifest of the programming schedule that is prepared for the media player 150.

In step 615, the assembly services 147 determines whether the programming is in an advertisement break or includes advertisement breaks. If the programming is not in an advertisement break, in step 620, the assembly services 147 determines the graphics to be included in the graphics manifest such as scheduled graphics or personalized graphics as indicated by the personalization server 130. In step 625, the assembly services 147 generates the streaming graphics manifest that is transmitted to the media player 150.

It is again noted that the graphics manifest may be stored in the distribution cache 142 prior to delivery to the media player 150. However, if the programming is in an advertisement break, the assembly services 147 may determine that graphics are to be omitted during the advertisement breaks. Accordingly, in step 630, the assembly services 147 may generate an empty graphics manifest that is transmitted to the media player 150.

Figure 7:
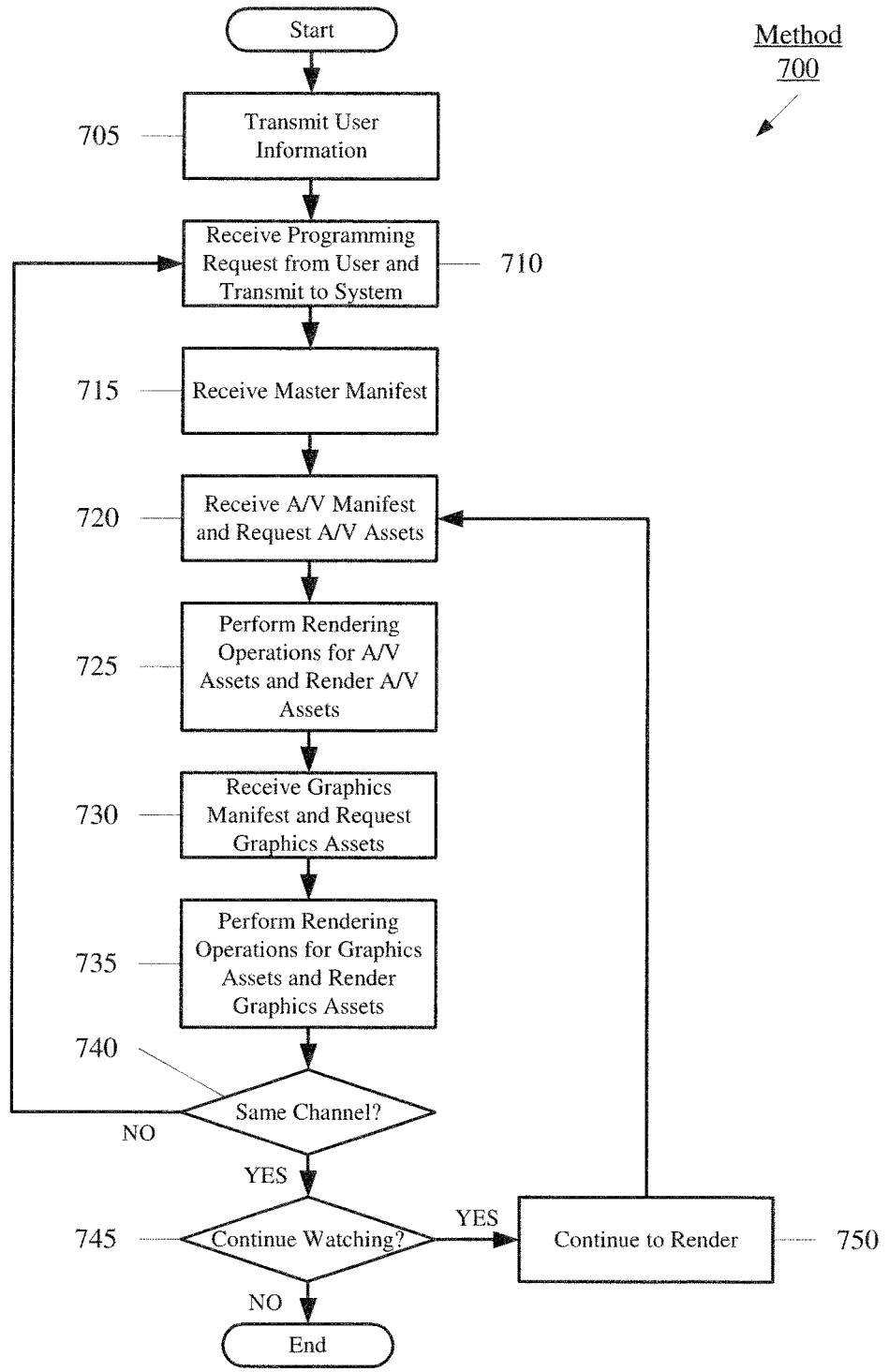
FIG. 7 shows a method for a rendering application to display programming according to the exemplary embodiments.

FIG. 7 shows a method 700 of displaying programming according to the exemplary embodiments. As discussed above, the media player 150 may request programming for playout on the display device 215. Upon receiving manifests from the assembly services 147, the media player 150 may perform various operations to provide the playout. The method 700 will be described with regard to the media player 150 of FIG. 2.

Initially, it may be assumed that the user has activated the media player 150. Therefore, upon activation, the media player 150 may perform a variety of initial operations such as connecting to the network associated with the assembly services 147 (e.g., the communications network 145). The media player 150 may also determine a selected channel, which may be preselected or selected from a list of known channels.

In step 705, the media player 150 may transmit user information associated with the user of the media player 150. The user information may be embodied in a variety of manners. The media player 150 may be configured to transmit data packages based upon entries received from a user entering inputs associated with user related information (e.g., age, demographic, location, ethnicity, etc.). The media player 150 may also be configured simply to transmit an identifier of the media player 150 (e.g., a serial number) which may be used by the assembly services 147 to identify the user associated with the media player 150 via a user profile stored on the personalization server 130 (e.g., registered customer of the television service). The user identity may entail various user related information. The user information may also specify which user from among a plurality of users who utilize the media player 150 is currently using the media player. For example, upon activation of the media player 150, the user may enter a specific user identifier to indicate that a particular user among the plurality of users is currently using the media player 150.

In step 710, the media player 150 receives a programming request from the user. As discussed above, the activation of the media player 150 may set the channel to a preselected or previously selected channel. This channel may correspond to a programming request from the user. The user may also utilize an input device (e.g., a remote control) to enter a programming request by identifying a selected channel. The media player 150 may determine the channel and package a request to the assembly services 147 through the communications network 145 and the CDN 149.

After the programming request has been transmitted to the assembly services 147, the assembly services 147 may perform the above described operations as embodied in the methods 400, 500, 600 of FIGS. 4-6, respectively.

In step 715, the media player 150 receives the manifest of the programming schedule. As described above, the scheduling module 110, the distribution module 125, and the assembly services 147 may have contributed to the creation of the manifest of the programming schedule. The programming schedule manifest may have included the ordering of the A/V assets and the graphics assets that are to be shown in the playout of the selected channel.

In step 720, the media player 150 receives the A/V manifest. Based upon the information (e.g., itemization of the media chunks) included in the A/V manifest, the media player 150 may transmit a request for the data corresponding to the selected programming. Specifically, the media player 150 may transmit the request to the CDN 149. As described above, the distribution system 102 may have published the A/V assets to the distribution cache 142 such that the request to the CDN 149 may enable the transmission of the A/V assets to be received by the media player 150. It is again noted that the A/V assets may include the personalized advertisement. Thus, in a particular example, the A/V assets may have included the digitally served advertisements that were trafficked by the advertisement server 135, using the targeting parameters specified by the scheduling module 110, and inserted by the assembly services 147. Therefore, in step 725, the media player 150 performs rendering operations for the A/V assets (e.g., the media and the advertisements) and renders the A/V assets for playout. As the media player 150 receives and renders media, the media player 150 may measure available bandwidth and adjust an A/V bitrate to optimize streaming quality.

In step 730, the media player 150 receives the graphics manifest. Based upon the information (e.g., itemization of the graphics) included in the graphics manifest, the media player 150 may transmit a request for the data corresponding to the selected graphics. Specifically, the media player 150 may transmit the request to the CDN 149. As described above, the distribution system 102 may have published the graphics assets to the distribution cache 142 such that the request to the CDN 149 may enable the transmission of the graphics assets to be received by the media player 150. Therefore, in step 735, the media player 150 performs rendering operations for the graphics assets and renders the graphics assets for playout. For example, the media player 150 may render the graphics at the display resolution of the A/V assets, or possibly at a larger resolution for visually impaired viewers.

It should be noted that the method 700 is illustrated as a linear progression of steps in which the master manifest is first received, then performing the A/V operations, and subsequently performing the graphics operations. However, this is only exemplary. The media player 150 may also perform these operations in a parallel manner. The media player 150 loops from step 720 to step 750, continually fetching A/V and graphics manifests from the CDN 149 and assembly services 147, and subsequently fetching and rendering the referenced A/V and graphics media segments. Each A/V and graphics manifest may represent a time interval that is typically between 2 and 10 seconds.

In step 740, the media player 150 determines whether the same channel is still tuned to continue the playout of the programming as defined by the manifest of the programming schedule. If a different channel is being tuned, the media player 150 returns to method 400 to request a master manifest playlist for the new channel.

However, if the media player 150 determines that the same channel is still tuned, the media player 150 continues the method 720 to step 745. In step 745, the media player 150 determines whether the user is still watching the programming such as whether the media player 150 is still activated. If still activated, the media player 150 continues to step 750 where the requesting, receiving, and rendering operations are continued.

The exemplary embodiments described above relate to a mechanism in which the user of the media player 150 may select programming and view a playout of the programming using the above described operations and features. However, the exemplary embodiments may also be adapted and modified for use across a plurality of users. For example, a converged viewing feature may be provided through the above-described mechanisms of the exemplary embodiments. The converged viewing feature may enable a scheduling where a globally shared or converged viewing of events is allowed where an entire audience may watch a common program (e.g., a premiere of a show). This converged viewing may also span across different channels such that a first viewer on a first channel that would otherwise have first programming would receive the common programming. A second viewing on a second channel that would otherwise have second programming would also receive the common programming. In this manner, a converged viewing feature may be provided using the exemplary embodiments.

The exemplary embodiments provide a device, system, and method of hybrid distribution of media content. The exemplary embodiments provide a mechanism by which a non-linear distribution model of media content playback is utilized with the appearance and usage of a linear distribution model with regard to a user viewing the media content. The exemplary embodiments further provide a mechanism by which to personalize the virtual linear media content playback in which programming, advertisements, graphics, etc. may be targeted and/or catered to the user. Specifically, the programming/advertisements may be provided in a separate delivery from the graphics such that the synthesizing of the assets may be modified easily.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system such as Microsoft Windows, a Mac platform and MAC OS, a mobile device having an operating system such as iOS or Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
  in a media content distribution system comprising an origination services network device and an assembly services network device:
  receiving, by the assembly services network device, a programming request from a remote media player, the programming request identifying a program being shown on a selected channel to be tuned on the media player;
  generating, by the origination services network device, a programming schedule for the media player, the programming schedule defining an ordering for playout of audio/visual (A/V) assets and graphics assets associated with the program, the A/V assets including programming assets and advertisement assets combined to create the program, the programming schedule defining the ordering of the programming assets and the advertisement assets;
  generating, by the origination services network device, an A/V manifest for the media player, the A/V manifest identifying the A/V assets for the media player to request the A/V assets from a content delivery network (CDN);
  generating, by the origination services network device, a graphics manifest for the media player, the graphics manifest identifying the graphics assets for the media player to request the graphics assets from the CDN; and
  transmitting, by the assembly services network device, the programming schedule, the A/V manifest, and the graphics manifest to the media player.

2. The method of claim 1, further comprising:
  determining a user associated with the media player, the user having a user profile indicating personal preferences.

3. The method of claim 2, further comprising:
  determining a further program in a channel lineup for the selected channel;
  determining a replacement program for the further program based upon the personal preferences; and
  replacing the further program with the replacement program in the channel lineup.

4. The method of claim 2, wherein the graphics assets are selected based upon the personal preferences.

5. The method of claim 1, wherein the advertisement assets are selected based upon the personal preferences.

6. The method of claim 1, further comprising:
  requesting the A/V assets and the graphics assets from the CDN; and
  publishing the A/V assets and the graphics assets to a cache,
  wherein the programming schedule, the A/V manifest, and the graphics manifest are stored in the cache prior to transmitting.

7. The method of claim 1, further comprising:
  receiving an asset request from the media player for the A/V assets and the graphics assets based on the A/V manifest and the graphics manifest, respectively;
  transmitting the A/V assets and the graphics assets to the media player, the A/V assets and the graphics assets being transmitted independently of each other for local rasterization on the media player.

8. The method of claim 1, wherein the programming asset is a pre-recorded programming asset or a live programming asset.

9. The method of claim 1, wherein the programming schedule includes first portions for globally shared viewing events and second portions for distinct programming relative to the media player.

10. A media content distribution system, comprising:
  an assembly service component comprising a first processor and a first memory, the first memory storing a first executable program instructing the first processor to receive a programming request from a remote media player, the programming request identifying a program being shown on a selected channel to be tuned on the media player; and
  an origination service component comprising a second processor and a second memory, the second memory storing a second executable program instructing the second processor, including a scheduling module and an assembly services module to, la the scheduling module, generate a programming schedule for the media player, the programming schedule defining an ordering for playout of audio/visual (A/V) assets and graphics assets associated with the program, the A/V assets including programming assets and advertisement assets combined to create the program, the programming schedule defining the ordering of the programming assets and the advertisement assets, to, by the assembly services module, generate an A/V manifest for the media player, the A/V manifest identifying the A/V assets for the media player to request the A/V assets from a content delivery network (CDN), and to, by the assembly services module, generate a graphics manifest for the media player, the graphics manifest identifying the graphics assets for the media player to request the graphics assets from the CDN, wherein the programming schedule, the A/V manifest, and the graphics manifest are transmitted to the media player.

11. The media content distribution system of claim 10, further comprising:

a personalization server determining a user associated with the media player, the user having a user profile indicating personal preferences.

12. The media content distribution system of claim 11, wherein the assembly services module determines a further program in a channel lineup for the selected channel, determines a replacement program for the further program based upon the personal preferences, and replaces the further program with the replacement program in the channel lineup.

13. The media content distribution system of claim 11, wherein the graphics assets are selected based upon the personal preferences.

14. The media content distribution system of claim 10, wherein the advertisement assets are selected based upon the personal preferences.

15. The media content distribution system of claim 10, wherein the assembly services module requests the A/V assets and the graphics assets from the CDN and publishes the A/V assets and the graphics assets to a cache, wherein the programming schedule, the A/V manifest, and the graphics manifest are stored in the cache prior to transmitting.

16. The media content distribution system of claim 10, wherein the assembly service component receives an asset request from the media player for the A/V assets and the graphics assets based on the A/V manifest and the graphics manifest, respectively, and wherein the A/V assets and the graphics assets are transmitted to the media player, the A/V assets and the graphics assets being transmitted independently of each other for local rasterization on the media player.

17. The media content distribution system of claim 10, wherein the programming asset is a pre-recorded programming asset or a live programming asset.

18. A method, comprising:

in a media player:

transmitting a programming request identifying a program being shown on a selected channel to be tuned on the media player;

receiving a programming schedule for the media player, the programming schedule defining an ordering for playout of audio/visual (A/V) assets and graphics assets associated with the program, the A/V assets including programming assets and advertisement assets combined to create the program, the programming schedule defining the ordering of the programming assets and the advertisement assets;

receiving an A/V manifest for the media player, the A/V manifest identifying the A/V assets for the media player to request the A/V assets from a content delivery network (CDN);

receiving a graphics manifest for the media player, the graphics manifest identifying the graphics assets for the media player to request the graphics assets from the CDN;

transmitting a request for the A/V assets and the graphics assets from the CDN as identified in the A/V manifest and the graphics manifest, respectively;

receiving the A/V assets and the graphics assets; and rendering the A/V assets and the graphics assets for playout on a display device based upon the programming schedule.

\* \* \* \* \*

UNITED STATES PATENT AND TRADEMARK OFFICE
CERTIFICATE OF CORRECTION

PATENT NO. : 10,165,316 B2
APPLICATION NO. : 15/087626
DATED : December 25, 2018
INVENTOR(S) : Riedel et al.

Page 1 of 1

It is certified that error appears in the above-identified patent and that said Letters Patent is hereby corrected as shown below:

In the Claims

Column 22, Claim 10, Line 66:
"an assembly services module to, la the scheduling" should be "an assembly services module to, by the scheduling"

Signed and Sealed this
Twenty-eighth Day of April, 2020

Andrei Iancu
*Director of the United States Patent and Trademark Office*